(12) United States Patent
Zhang et al.

(10) Patent No.: US 10,875,323 B2
(45) Date of Patent: Dec. 29, 2020

(54) SHELL FOR A PORTABLE TELECOMMUNICATION SYSTEM

(71) Applicant: QuickerPics, LLC, Los Angeles, CA (US)

(72) Inventors: David Zhang, Guyancourt (FR); Clement Perrot, Paris (FR); Robin Barata, Paris (FR)

(73) Assignee: QuickerPics, LLC, Los Angeles, CA (US)

( * ) Notice: Subject to any disclaimer, the term of this patent is extended or adjusted under 35 U.S.C. 154(b) by 0 days.

(21) Appl. No.: 16/170,811

(22) Filed: Oct. 25, 2018

(65) Prior Publication Data

US 2019/0061376 A1   Feb. 28, 2019

Related U.S. Application Data

(62) Division of application No. 15/507,636, filed as application No. PCT/FR2015/052287 on Aug. 28, 2015.

(30) Foreign Application Priority Data

Aug. 28, 2014  (FR) ..................... 14 58066
Jan. 5, 2015   (FR) ..................... 15 50027

(51) Int. Cl.
  *B41J 3/36*   (2006.01)
  *A45D 33/26*  (2006.01)
  (Continued)

(52) U.S. Cl.
  CPC .............. *B41J 3/36* (2013.01); *A45D 33/26* (2013.01); *B41J 2/32* (2013.01); *G06F 1/1632* (2013.01); *A45C 2011/002* (2013.01)

(58) Field of Classification Search
  CPC . B41J 29/00; B41J 29/02; B41J 29/023; B41J 29/026; B41J 3/36; B41J 2/32; G06F 1/1632; A45D 33/26; A45C 2011/002
  See application file for complete search history.

(56) References Cited

U.S. PATENT DOCUMENTS 8,298,696 B1    10/2012 Dana
2001/0055121 A1 12/2001 Omura et al.
(Continued)

FOREIGN PATENT DOCUMENTS

WO    2016030637 A2   3/2016

OTHER PUBLICATIONS

Non-Final Office Action issued in related U.S. Appl. No. 15/507,636 dated Nov. 1, 2018.
(Continued)

*Primary Examiner* — Kristal Feggins
(74) *Attorney, Agent, or Firm* — Mark H. Whittenberger; Holland & Knight LLP

(57) ABSTRACT

A shell for a portable telecommunication system (3) comprises a surface defining a hollow volume, suitable for being mechanically connected in a removable manner to a portable telecommunication system (2), said portable telecommunication system (2) being able to be inserted, at least partially, in the hollow volume, said portable telecommunication system (2) comprising a memory suitable for storing a computer document, the shell being characterized in that it comprises a communication unit suitable for receiving a document stored in the memory from the portable telecommunication system (2), and a miniature printing device (1) for documents, suitable for receiving said computer document via the communication unit and for printing same.

14 Claims, 18 Drawing Sheets

(51) Int. Cl.
*B41J 2/32* (2006.01)
*G06F 1/16* (2006.01)
*A45C 11/00* (2006.01)

(56) References Cited

U.S. PATENT DOCUMENTS

| | | |
|---|---|---|
| 2004/0233267 A1 | 11/2004 | Silverbrook |
| 2006/0083564 A1 | 4/2006 | Yazawa et al. |
| 2006/0228143 A1 | 10/2006 | Kuo |
| 2008/0069620 A1 | 3/2008 | Anderson et al. |
| 2009/0002730 A1 | 1/2009 | Yamada et al. |
| 2012/0087078 A1 | 4/2012 | Medica et al. |
| 2013/0250510 A1 | 9/2013 | Andutan |
| 2013/0260675 A1 | 10/2013 | Chan et al. |
| 2016/0316074 A1* | 10/2016 | Chae .................. G06F 3/13 |
| 2017/0274671 A1 | 9/2017 | Zhang et al. |

OTHER PUBLICATIONS

International Search Report issued in related PCT Application: PCT/FR2015/052287 dated Feb. 17, 2016.
Notice of Allowance issued in related U.S. Appl. No. 15/507,636 dated Feb. 7, 2020.
Notice of Allowance issued in related U.S. Appl. No. 15/507,636 dated May 18, 2020.

* cited by examiner

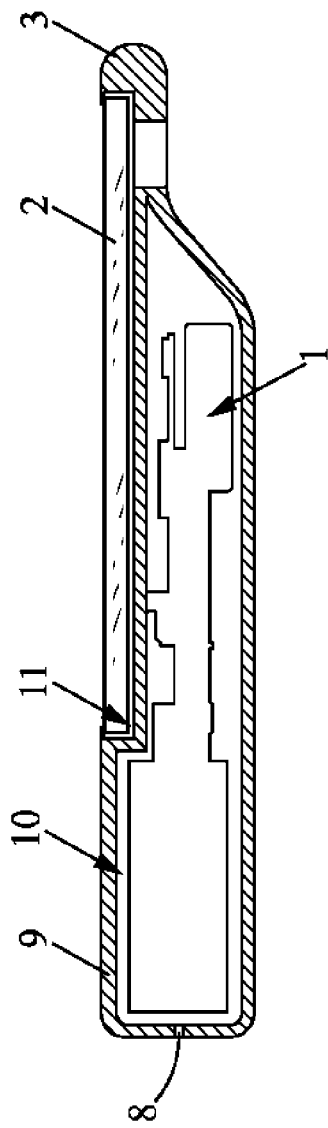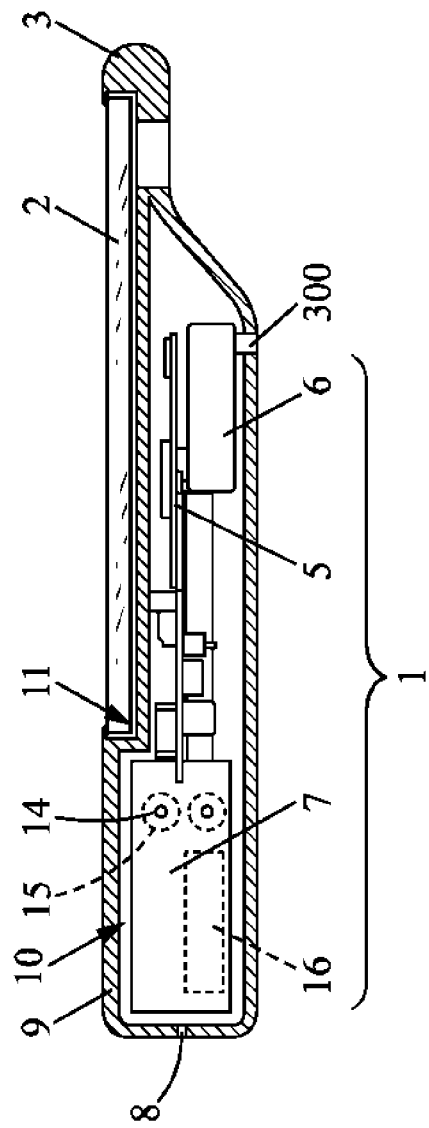

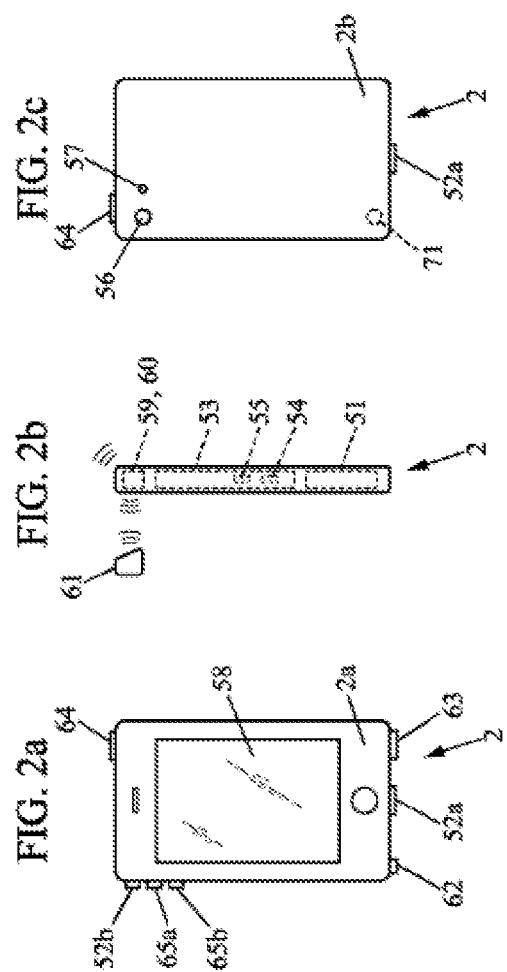

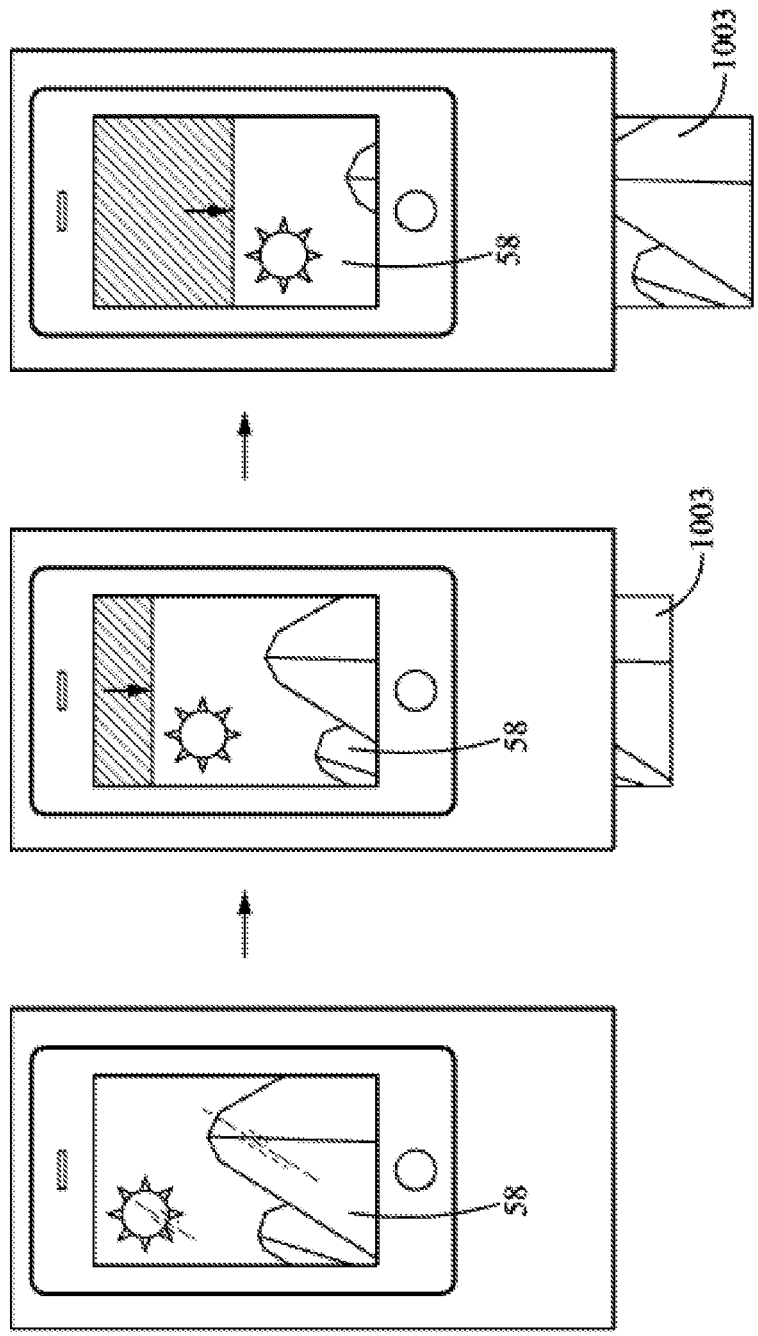

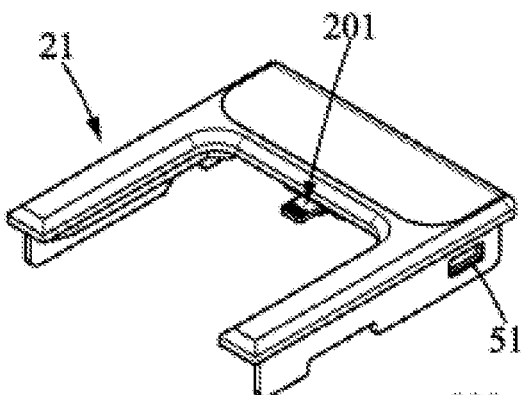
FIG. 20a
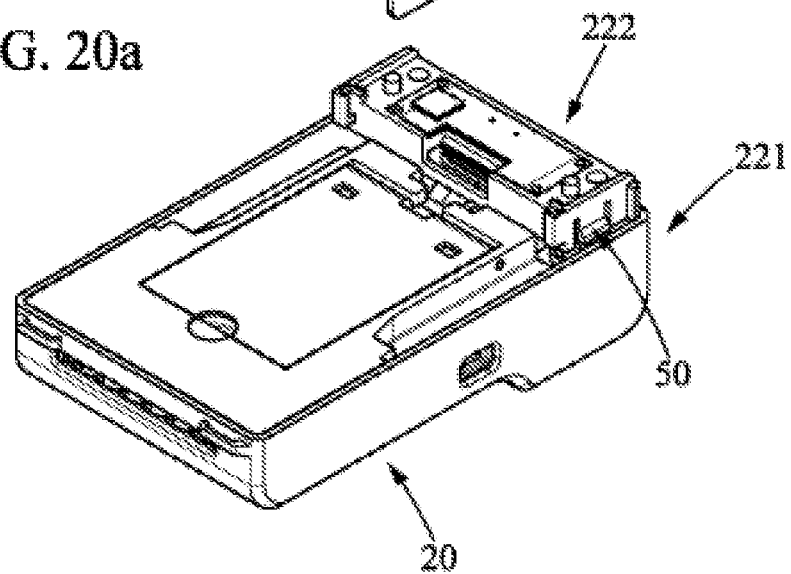
FIG. 20b
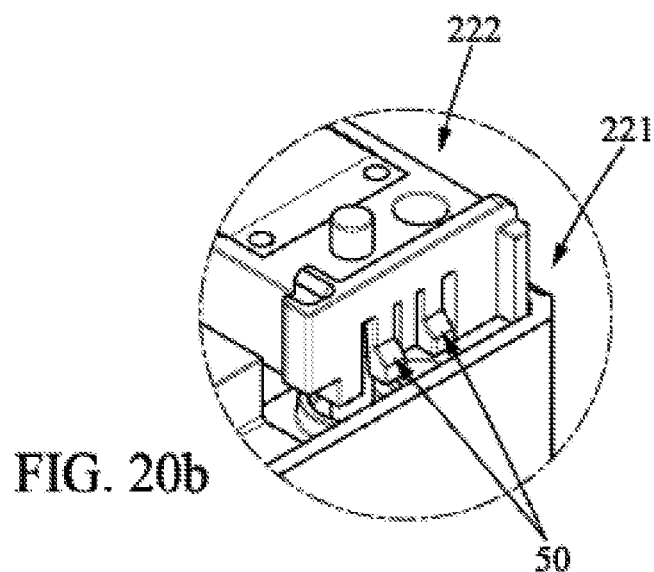

SHELL FOR A PORTABLE TELECOMMUNICATION SYSTEM

RELATED APPLICATIONS

The subject application is a divisional application of U.S. patent application with Ser. No. 15/507,636, filed on Feb. 28, 2017, which is a U.S. National Stage of International Patent Application No. PCT/FR2015/052287, filed Aug. 28, 2015, which claims priority to French Patent Application No. 1550027, filed Jan. 5, 2015 and French Patent Application No. 1458066, filed Aug. 28, 2014, the entire content of which is herein incorporated by reference.

The present invention relates to the shells for mobile telecommunications systems.

More particularly, the invention relates to a shell for a mobile telecommunications system which includes a surface defining a hollow volume, adapted to be mechanically linked in a removable manner to a mobile telecommunications system, said mobile telecommunications system that can be partially at least inserted in the hollow volume, said mobile telecommunications system including a suitable memory to store a computer document said mobile telecommunications system also comprising a camera.

The primary purpose of a shell for mobile telecommunications system is the protection of the latter, especially in the case of impact or being dropped.

Some manufacturers offer shells for portable systems comprising additional features to that of the protection of the portable system. The "Callstel" brand offers, for example, a shell with an extra battery for the portable system.

We also know of a portable miniature printing device, which can be mechanically and electrically connected to a telecommunication system cell such as a smartphone to allow printing of images contained in the phone, as in the document US2001/0055121. Such a printing device does not permit the taking of a picture when mounted with the mobile telecommunication system.

The present invention is intended to offset these disadvantages. In fact, it is intended to provide a miniature printing device constantly available to the user of the mobile telecommunication system, and adapted to be able to take pictures with the telecommunication system when it is assembled with the portable miniature printing device.

For this purpose, according to the invention, a shell for the mobile telecommunication system of the kind in question is characterized in that it comprises a mechanism of communication adapted to receive an electronic document from the mobile telecommunications system stored in its memory, and a miniature device to print documents, adapted to print the said electronic document, with the camera of the mobile telecommunication system uncovered by the shell.

With this layout, the printing functionality is available on the mobile assembly without the need to proceed to an additional assembly for the user. The shell further ensures its protective function of the mobile telecommunication system. The user can therefore use the camera of the mobile telecommunication system even when the assembly is fully mounted. Thus, the printing device is adapted so that the optical features of the mobile telecommunication system are available. In addition, the mobile telecommunications system is effectively maintained in the printing device so that you can manipulate the assembly in different directions to take the photo without having the printing device and the mobile telecommunication system come apart. Thus, the invention allows to instantly convert a mobile telecommunications system into a camera equipped with a printing device.

In some of the preferred embodiments of the invention, we may eventually be able to resort as well to one and/or the other of the following arrangements:

The miniature printing device includes at least one circuit board and a printer controlled by the circuit board.

The miniature printing device comprises a battery, the said battery is adapted to power the printer.

The miniature printing device comprises a power connector adapted to be connected to a battery of the mobile telecommunication system.

The shell comprises areas of transfer of command, said areas of transfer of command being adapted to transmit an activation command from the buttons of the mobile telecommunication system through the shell, the buttons of the mobile telecommunications system being adapted to operate the mobile telecommunication system functions.

The shell includes openings in the surface of the shell, such openings being adapted to uncover the optical features of the mobile telecommunication system.

The shell includes an opening adapted to uncover a screen of the mobile telecommunication system.

The shell includes an opening adapted to uncover an image sensor of the mobile telecommunication system.

The shell comprises two parts to be assembled, both parts being adapted to be assembled to form together the shell in which the mobile telecommunication system is at least partially inserted.

The shell includes a reservoir for print media, and a transfer mechanism adapted to draw the print media from the reservoir for print media to the miniature printing device.

The shell includes a return spring recalling the two parts one towards the other, so as to enclose the mobile telecommunication system between them.

The shell includes an extraction slot for the print media, and a suitable transfer mechanism to draw the print media from the reservoir of the print media towards the 15 print media slot extraction slot.

According to still another aspect, the invention relates to an assembly comprising a mobile telecommunications system and a shell for the mobile telecommunication system, the shell being mechanically linked in a detachable manner to the system to mobile telecommunication, the said mobile telecommunications system comprising a memory adapted for storing a computer document, the shell comprising a body of communication adapted to receive a mobile telecommunication system computer document stored in the memory, and a miniature device to print documents, adapted to receive via the communications system and print the said computer document.

In some of the preferred embodiments of the invention, we may eventually be able to resort as well to one and/or the other of the following arrangements:

the shell includes a shutter release button for picture taking, said trigger button being adapted for launch on the mobile telecommunication system, when pressed, an application that triggers the taking of the photo the shutter release button is suitable to trigger 5 printing a photo when it is pressed.

the assembly includes a sensor detecting the connection of the shell and the mobile telecommunication system, the shell preventing printing when you activate the shutter in case of the absence of a connection to the shell and a mobile telecommunications system.

the shell includes a shutter release button for picture taking, said trigger button being adapted to launch on the mobile telecommunication system, when it is pressed, an application initiates the taking of a photo and printing of the said photo.

the printing of a photo is controlled by activating, via the touchscreen the mobile telecommunications system, an application adapted to trigger the taking of a photo.

the application relating to the taking of a picture and/or a printing is launched by connecting the mobile telecommunication system to the shell.

the miniature printing device receives the computer documents contained in the memory of the portable system via wired or wireless connection.

the mobile telecommunication system is a smartphone.

the mobile telecommunication system is connectible by radio waves to an external base.

the computer document includes an image captured by the mobile telecommunication system or contained in an external database to the mobile telecommunications system accessible by mobile telecommunications system.

According to still another aspect, the invention relates to a computer program product stored on a portable telecommunications system included in the assembly, which the product is suitable to trigger the printing of a computer document contained in a portable communication system memory when the computer program product is executed by a processor of the assembly.

According to one aspect, the shell includes a casing, an adapter at least part of the hollow volume, and a system of communication between the adapter and the casing, in which case includes the miniature printing device.

According to one aspect, the adapter includes a microcontroller dedicated to the mobile telecommunication system.

According to one aspect, the communication system includes a first connector supported by the adapter, and a second connector, complementary to the first connector, supported by the case.

According to one aspect, the casing and the adapter together delineate at least a portion of the hollow volume.

According to one aspect, the casing includes a base portion and a mobile unit with regards to the base portion and with the adapter, the communication system between the adapter and the casing comprising a flexible flat cable connection.

According to one aspect, the adapter includes the communication system.

According to another aspect, the invention relates to such an adapter.

According to another aspect, the invention relates to an assortment of shells, the casings are identical, and the adapters are different.

According to one aspect, the adapters differ by one and/or both of the following characteristics:
a dimension of the adapter,
location of the adapter component,
a connector of the adapter,
a microcontroller of the adapter.

According to another aspect, an invention relates to a system comprising:
A shell for mobile telecommunication system,
A paper refill,
A detachable fastener interface of the paper refill and adapted shell to alternatively attach the refill to the shell in a position where a paper support can be extracted from the paper refill with a view to print, and to withdraw it.

In particular, the paper refill can include the means of the detachable attachment to the shell.

According to another aspect, an invention relates to a process in which:
A picture is selected to print,
A detected movement is compared on the surface of the screen of the mobile telecommunication system with a predetermined move for the launch of a printing, in case of positive comparison, the printing is triggered,
Wherein the predetermined movement comprises a continuous displacement of an amplitude greater than a predetermined amplitude according to a direction for which the main component is in the direction of the slot.

According to another aspect, an invention relates to a process in which:
On a screen of the mobile telecommunication device, it displays an image to print, Following receipt of a print command, it displays in a successively repeated manner on the said screen a plurality of images each with a transfer of the previous image to print in the direction of the slot to print, the transfer speed is synchronized with the printing speed.

Other features and advantages of the invention will appear during the next description of many of its embodiments, provided as non-limiting examples, with respect to the attached drawings.

On the drawings:

FIG. 1 is a cross-sectional view of the assembly of the shell with the mobile telecommunication system, FIGS. 2*a* to 2*c* are views from the front, side and back, respectively, of the mobile telecommunication system, FIG. 3 is a blueprint of the concept of operation of the assembly, FIG. 4 is a cross-sectional view of the assembly of the shell with the mobile telecommunication system and of different components of the miniature printing device, FIG. 5 illustrates the shell alone, FIG. 6 is a blueprint view of the circuit board, FIGS. 7*a* and 7*b* are views of the assembly of the shell with the mobile telecommunications system and connectivity on the shell, FIGS. 8*a* and 8*b* are views of the layout of the printing system in relation to the mobile telecommunications system device, FIG. 9 shows the print media reservoir, FIG. 10 is a view of the assembly of the shell in two parts, FIG. 10*a* is a view of the shell of a single part, FIG. 11 illustrates a mode of assembling the two parts, FIG. 12 illustrates the scrolling of the computer document on the screen of the mobile telecommunication system during printing, FIG. 13 is a perspective view of a casing for a modular shell system, and FIGS. 14*a* and 14*b* are two examples of adapters for a modular shell system, FIGS. 15*a* and 15*b* are views of the shell to the adapter in closed and open position, respectively.

Figure 18A:
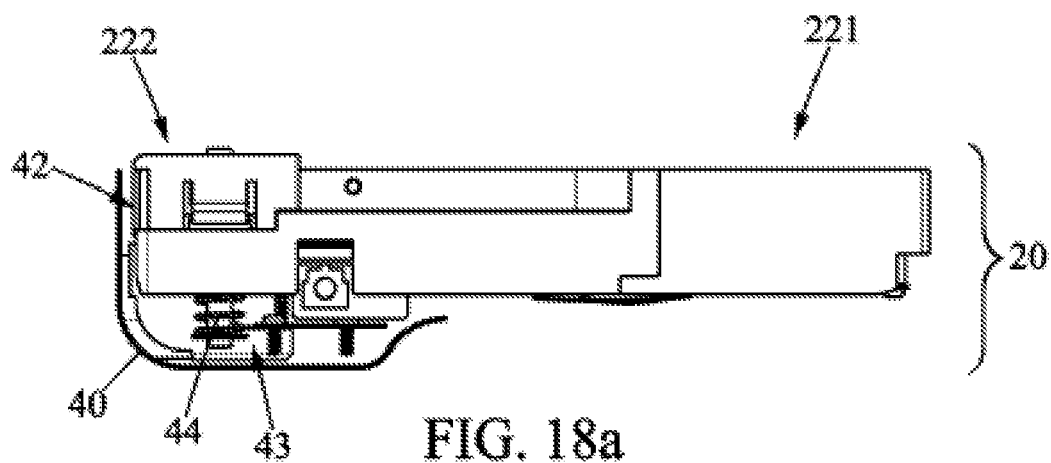
Figure 18B:
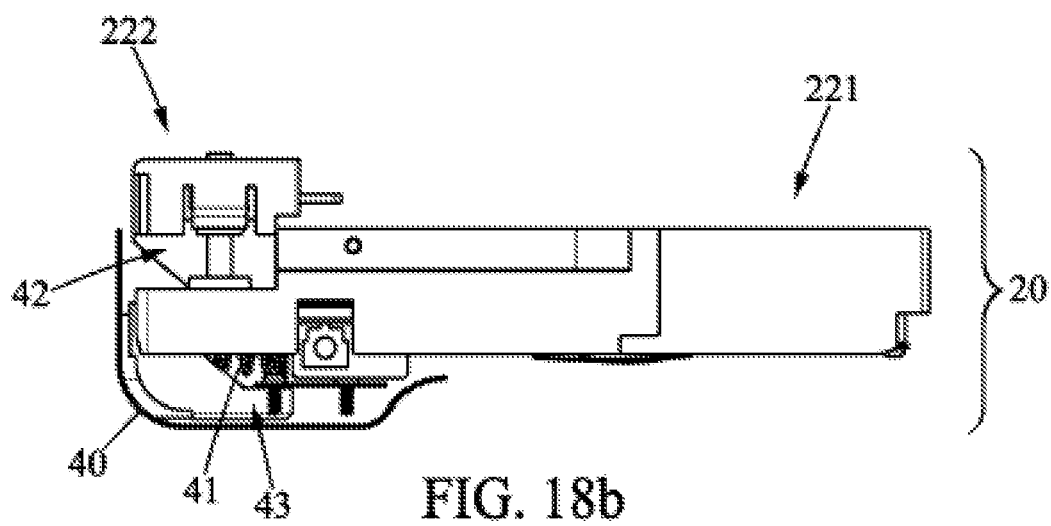
Figure 19A:
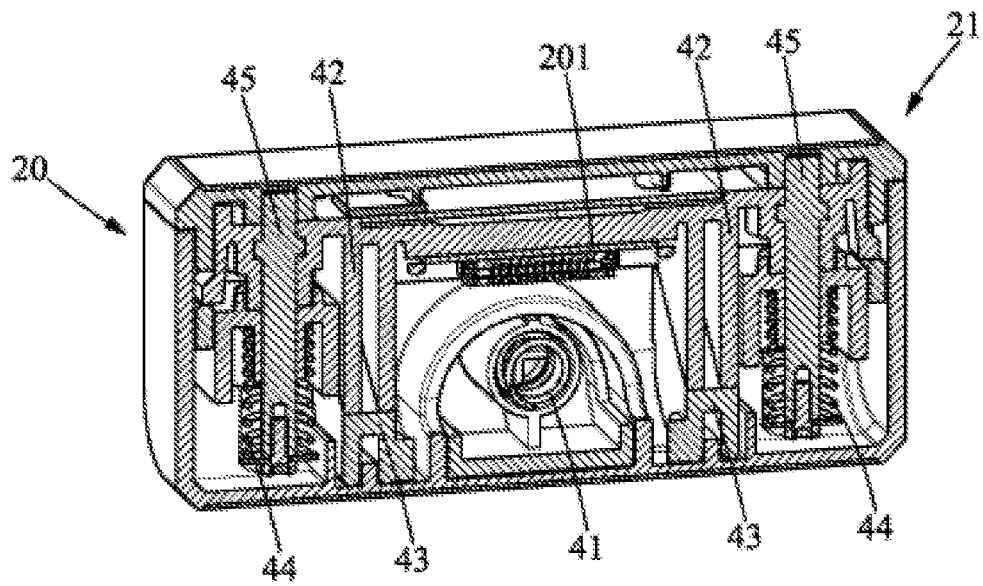
Figure 19B:
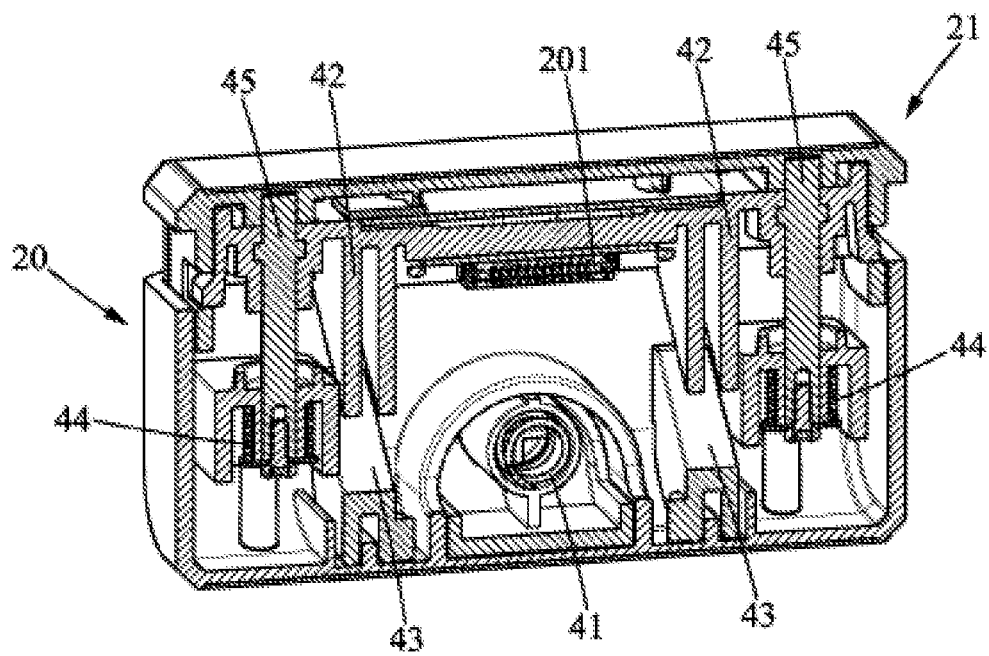
Figure 20C:
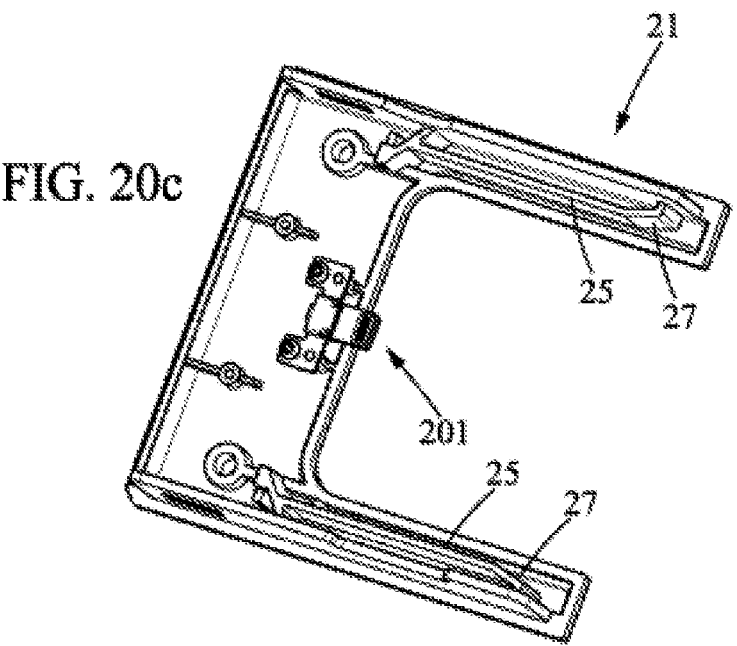

FIGS. 18a and 18b are cross-sectional views of the shell to the adapter in closed and open position, respectively, FIGS. 19a and 19b are cross-sectional views of the shell casing to adapter in the closed and open position, FIG. 20a is an exploded view of the casing and adapter, FIG. 20b is a detailed view of the clips on the surface of the mobile part of the casing, and FIG. 20c is a rotated view of the adapter.

Figure 21:
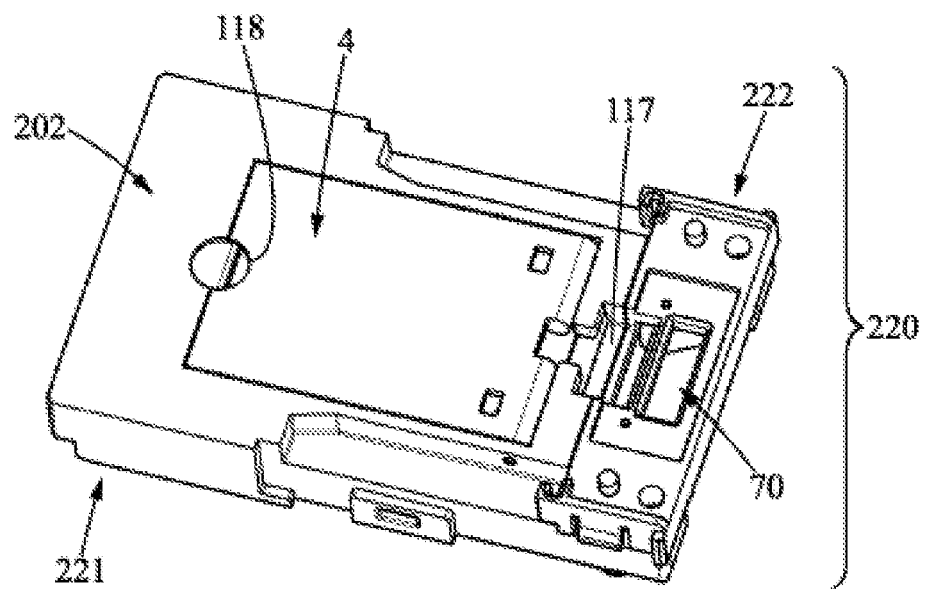
Figure 22:
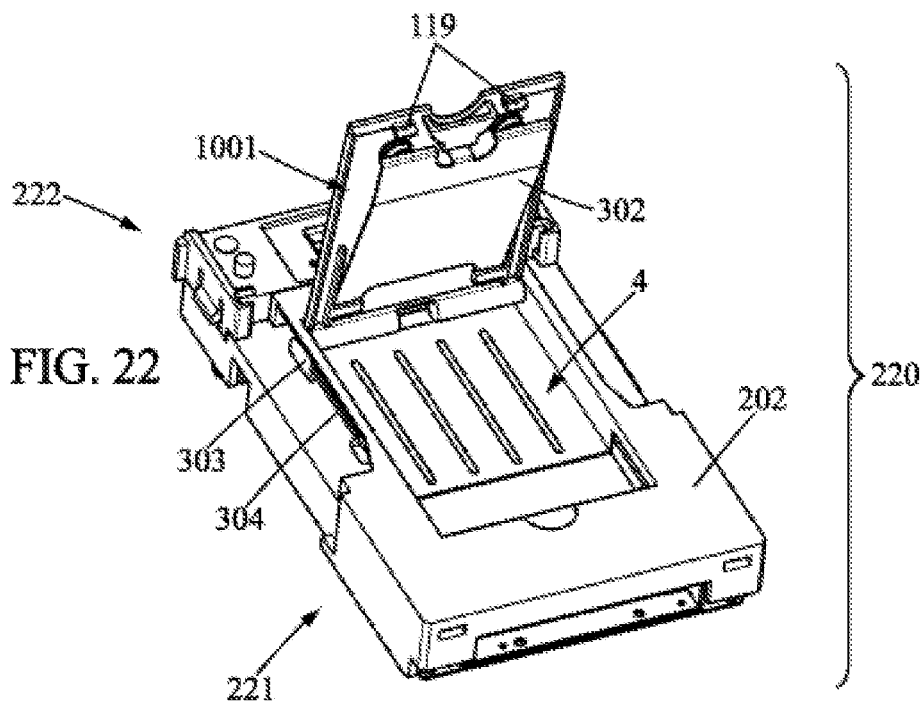
Figure 23:
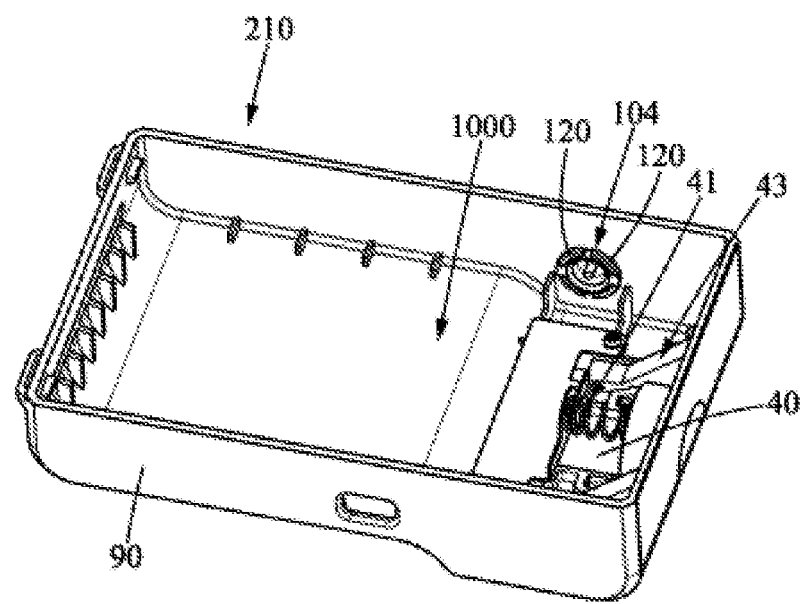
Figure 24:
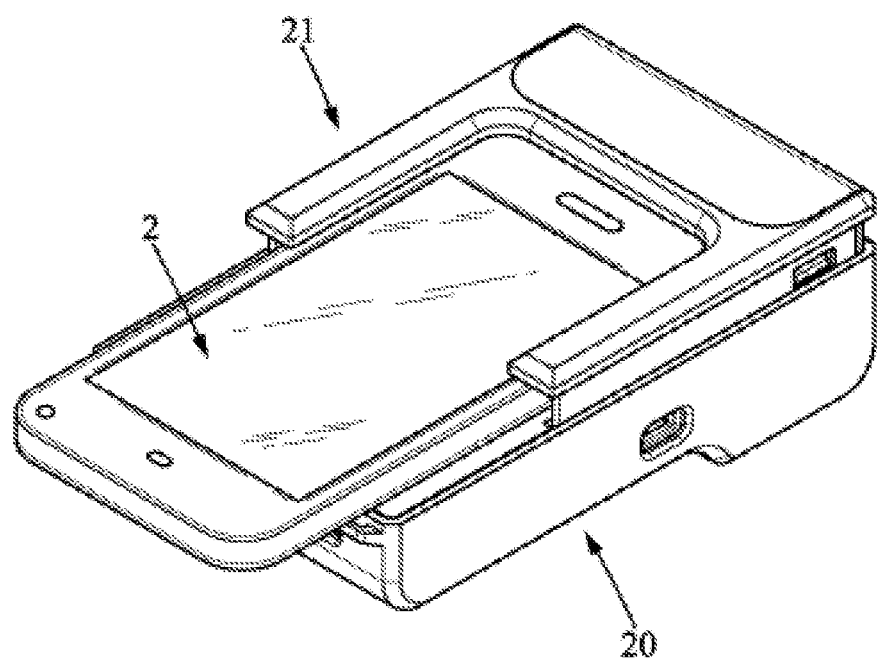

FIG. 21 is a view of the lower part of the shell casing to adapter,

FIG. 22 illustrates the reservoir of the shell casing to adapter,

FIG. 23 illustrates the trigger button the shell to adapter,

FIG. 24 is a view of the mobile telecommunications system assembled with the shell.

On the various figures, the same references refer to identical or similar items.

As illustrated in FIG. 1, a shell 3 is mechanically linked, in a removable manner, to a mobile 2 telecommunications system. The shell 3 includes a thin partition and a miniature printing device 1. The partition 9 defines an interior volume 10 in which is contained the miniature printing device 1. The images (or other computer documents) are contained on the mobile telecommunication system 2 or loaded on the mobile telecommunications system 2 from a database via a network. The miniature printing device 1 permits the printing of these images on a sheet of paper (or other print media 30) then extracted from the shell's 3 slot 8.

The partition 9 also defines a hollow volume 11 in which at least partially fits the mobile telecommunications system 2.

It is understood that by mobile telecommunication system, it is a system of sufficiently small dimensions and light enough to be carried.

In a specific embodiment that we will describe here, the mobile telecommunications system 2 is a smartphone and the shell 3 is a shell of the smartphone. The partition 9 of the shell 3 is, for example, in plastic or any material that may protect the mobile telecommunications system 2 from impact.

In FIGS. 2a-2c, we describe in a purely illustrative manner an example of a mobile telecommunications system adapted for the invention. The mobile telecommunications 2 system comes in the form of a thin rectangular parallelepiped. It consists of a front side 2a, and an opposite back side 2b, which are the two sides of a large surface. Very generally speaking, such a mobile telecommunication system 2 includes a 20 internal circuit board 53, and an internal battery 51 adapted to power the internal electronic circuit 53. The circuit board 53 includes a processor 54 and memory 55 adapted to store computer files. The circuit board 53 is 25 capable of managing a set of portable system components, such as an optical sensor 56 uncovering the surface of the mobile telecommunications 2 system, for example on the back face 2b, a flash 57 uncovering the surface of the mobile telecommunications 2 system of preference near the optical sensor 56, a screen 58 uncovering the surface of the mobile telecommunication 2 system, for example on the front face 2a, a user interface that allows the user to interact with the mobile telecommunications 2 system, such as for example a touchscreen embedded in the screen 58. In terms of user interface, the mobile telecommunication system 2 may also include one or more physical buttons 64, such as in particular an on/off button to alternatively start or stop the operation of the mobile telecommunication system 2. We can also anticipate +/−buttons 65a, 65b adapted to adjust an operational setting of the mobile telecommunications system 2, such as the sound level or the level of the optical setting of the screen. For example, these buttons are located on the edge.

The mobile telecommunications system 2 may also include one or more modules of communication 59, 60, for example a communication network module 59 adapted to communicate wirelessly to an external base 61 for access to the Internet by radio waves, and/or a telephone communication module 60 for telephone wireless communication. The mobile telecommunications system 2 may also include a communication module in near field 71, for example Bluetooth, NFC, or WiFi. The circuit board 53 can also manage a microphone 62 and/or loudspeaker 63 to capture and/or emit a sound, respectively.

The mobile telecommunications system 2 may also include one or more connectors 52a, 52b to be electrically connected to external equipment. In particular, there would be a connector 52a to connect the mobile telecommunication system 2 to an external power source to recharge the battery 51. We can anticipate a connector 52b for connection to a headset. Other connectors are conceivable.

The memory 55 is suitable for the storage of computer files. These files can be data files, such as image or text type. The processor 54 can also run one or more tailored computer programs to process one or more of these computer files. In terms of processors, files, storage, network, memory, we are referring to any type of device capable of implementing these functions, as understood by a person skilled in the art of computing.

Figure 3:
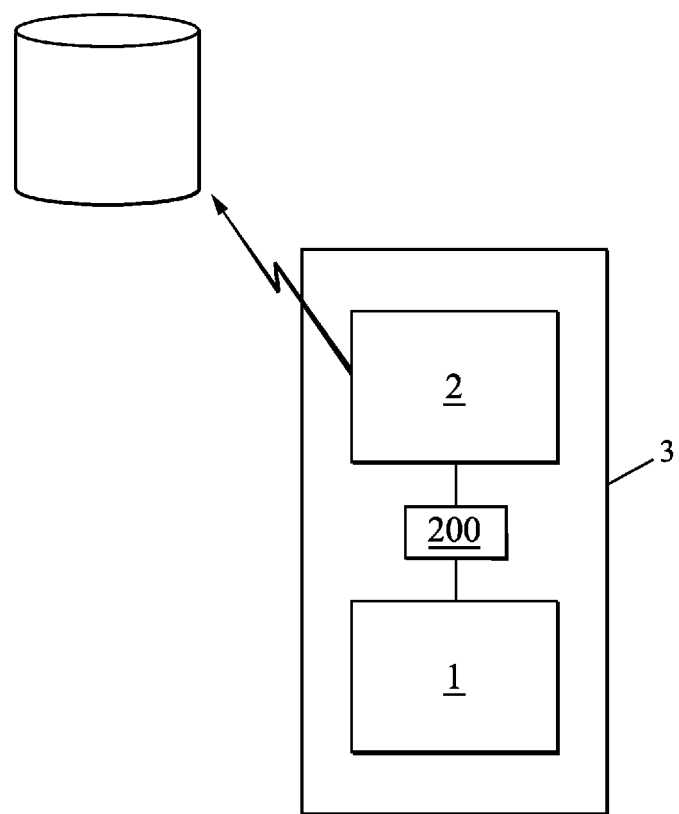

An example of the general principle of operation is illustrated by the diagram in FIG. 3. The mobile telecommunications system 2 captures an image, or receives an image from a database located in a network, by connecting for example via WiFi. The image is stored in the mobile telecommunication system 2. This image is transmitted to the printing device 1, connected by a communications system 200, for example a mechanical connection, such as a micro-USB connector, or by wireless connection, such as Bluetooth to the mobile telecommunication system 2, by an add-on to the near field communication module 71 for the near field communication. The printing is then initiated by the printing device 1 on print media. It is then extracted from the shell 3. The image is thus retrieved as a print.

More specifically, as illustrated in FIG. 4, the miniature printing device 1 includes a miniature printer 7 and a circuit board 5. The printer 7 is for example a thermal printer with a mechanical component of operation. The miniature printing device 1 can also include its own battery 6, as illustrated in FIG. 4, allowing independent operation of the miniature printing device 1. For example, the battery 6 is rechargeable via a 300 charging connector like a micro USB charger.

A commutator implementing a commutation "SWITCH" can be implemented. Any printing while the battery 6 is being be recharged is prohibited to avoid a possible destructive effect to the components of the shell in the event of printing at the same time as the recharge. A 5V plug is sufficient to recharge the device. A converter implementing a voltage increase function ("STEP UP" function) to increase the voltage of the charge to 9-10V can be used to recharge the battery 6.

The battery 6, for example, has a capacity of 1 to 50 prints, notably 20 to 25 prints. As a variant, the miniature printing device 1 might not include its own battery but use the battery 51 of the mobile telecommunications system 2, for example through a power connection between the circuit board 5 of the miniature printing device 1 and the battery from the portable system 2 through the charging connector 52a of the mobile telecommunications system plugged into the additional connector 201 of the shell. Different elements of the printing device 1 are arranged for example as shown in FIG. 4.

Figure 5:
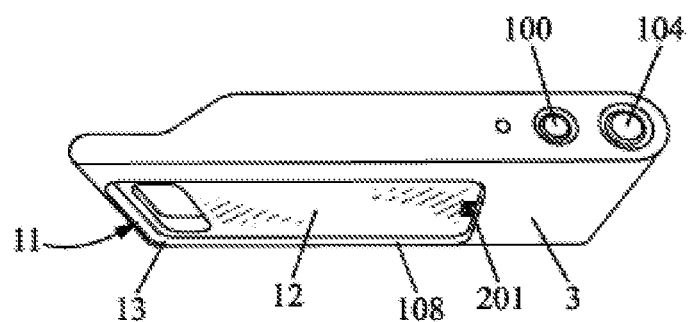

Notably, as seen in FIG. 5, the hollow space 11 presents a supplementary form to the shape of the mobile telecommunication system 2. This way, the mobile telecommunications system 2 can be assembled in the shell 3 with a complementarity of forms. The hollow space 11 is defined by a bottom 12 adapted to receive the face back 2b of the mobile telecommunications system 2 and a side wall 13 extending from the bottom 12, and intended to face the edge of the portable telecommunication system 2. The side wall 13 can preferably extend on the 4 sides and/or the 4 corners of the portable telecommunication system 2 so as to protect it from shocks. The bottom 12 defines the position of the portable telecommunication system 2 in the depth direction, and the lateral wall 13 in the lateral one, so that the front side 2a is at most flush with the outer surface of the shell 3.

The electronic card 5 extends under the bottom 12 (not shown in FIG. 4), particularly over the part of the portable telecommunication system 2 which does not carry the optical sensor. The printer 7 and the battery 6 are arranged on both sides of the electronic card 5 in the main longitudinal direction of the portable system 2. For example, as shown, the battery 6 is located at the back of the portable system 2, close to the optical sensor. The printer 7 is on the opposite side, and is longitudinally offset relative to the portable system 2.

The electronic card 5 manages the interaction of the miniature printing device 1 with the portable telecommunication system 2 via the communication component 200. The electronic card 5 controls and monitors the printer 7 in particular. The electronic card 5 also manages everything related to image processing (the image format, such as the colors of the image, the dpi format such as the image size). This information will be transferred to the print head of the printer 7. The print head of the printer 7 may be a commercial product produced by the company ALPS for example, as illustrated in FIG. 4. The mechanical part of the printer 7 comprises, for example, an electric motor 14 which, for example, drives a roller 15, in such a way that a printing medium is moved in the longitudinal direction by the roller 15 towards the print head 16. The electronic card 5 can be interfaced by a communication component 200, as described above, for example by means of a micro-USB connector, to the portable telecommunication system 2. One advantage of a mechanical connection will be, for example, the data transfer speed.

Figure 6:
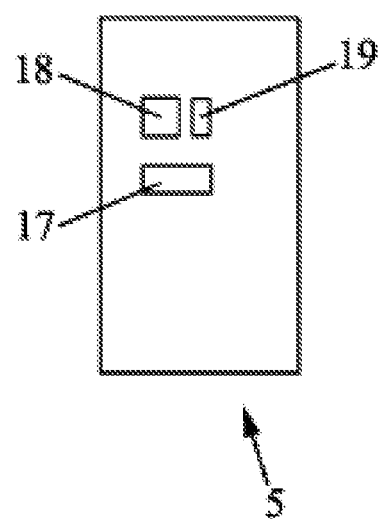

As shown in FIG. 6, the electronic card 5 integrates a microcontroller 17 for managing the assembly comprised of the miniature printing device 1 and the portable telecommunication system 2. It manages the connections of the printing device 1 with the various telephones or other portable systems 2 with which the cover can be assembled. It connects the "smartphone", for example, to the processor on the electronic card 5 which will process the image before printing it. The processor is, for example, a CONEXANT DC 1330 chip operating, for example, under LINUX. The transfer of data between the microcontroller 17 and the chip is performed, for example, by means of UART (Universal Asynchronous Receiver Transmitter) components.

The electronic card 5 also comprises a random access memory RAM 18. A memory of approximately 32 MB to 512 MB, for example one of 128 MB approximately, may be provided in order to run the printing software and to store data, as well as a FLASH memory 19 of a few MO for the storage of embedded software and digital data. The interface with the printer 7 comprises, for example, two connectors, for example a 26- and a 12-pin connector respectively, for controlling the thermal head 16 and the motor 14.

The microcontroller 17 may be, in a particular variant where the portable telecommunication system 2 is a telephone marketed under the iPhone and Apple brands, connected via an Apple identification co-processor. This item is a component imposed by Apple and its MFi (Made For iPhone) program so as to connect the cover to the iPhone via the dedicated connector. This is somehow the key that will unlock the iPhone's connection port and will allow the cover 3 to communicate with the iPhone.

The miniature printing device 1 is integrated in the thickness of the cover 3. It is for example glued to the wall 9. In the case of a wired electrical connection, through the communication component 201 between the miniature printing device 1 and the portable system 2 for example, the miniature printing device 1 connects to the portable telecommunication system 2 when the portable communication system 2 is inserted in the cover 3.

Figure 7A:
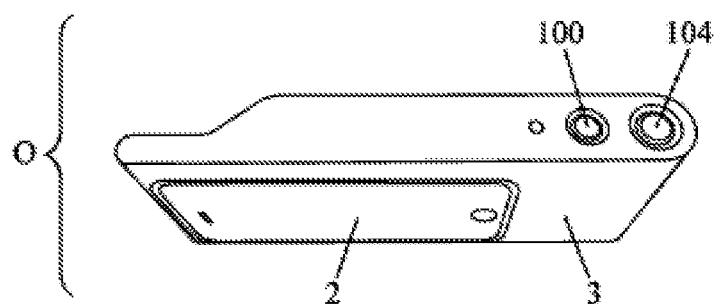
Figure 7B:
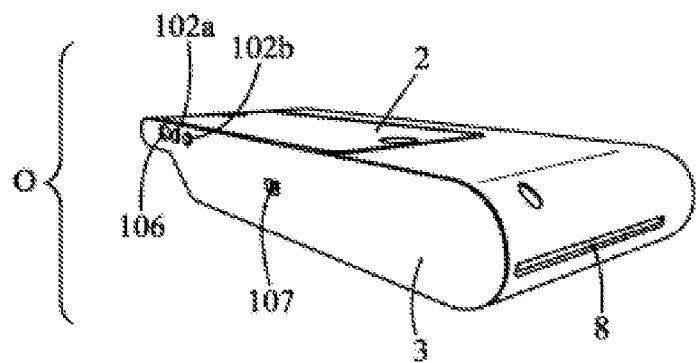
Figure 8A:
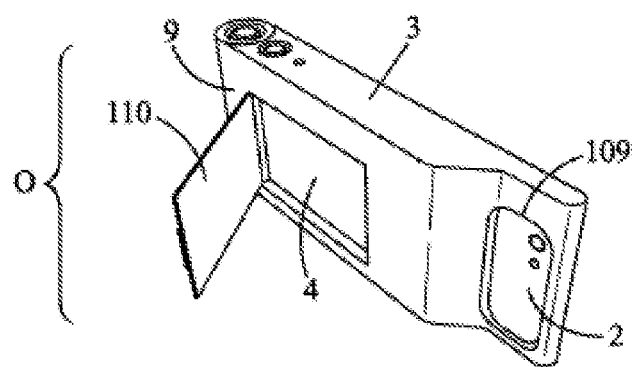
Figure 8B:
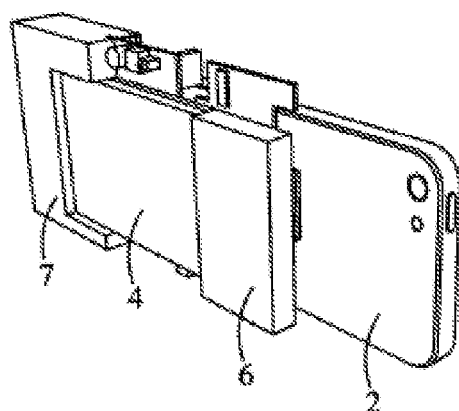
Figure 9:
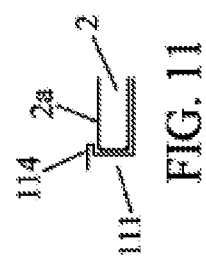
Figure 11:
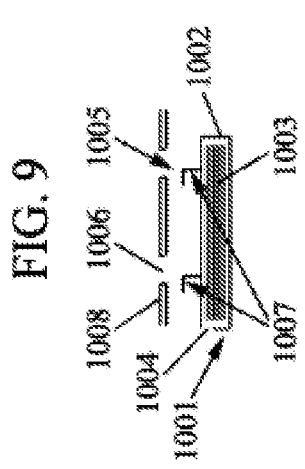
Figure 10:
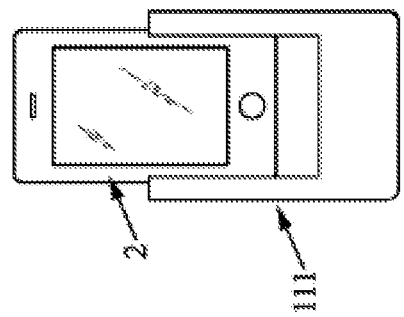
Figure 10A:
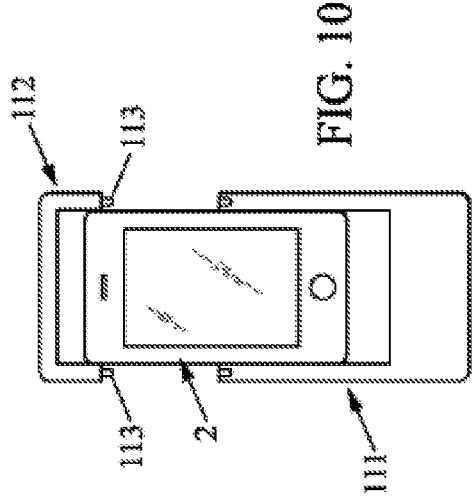
Figure 13:
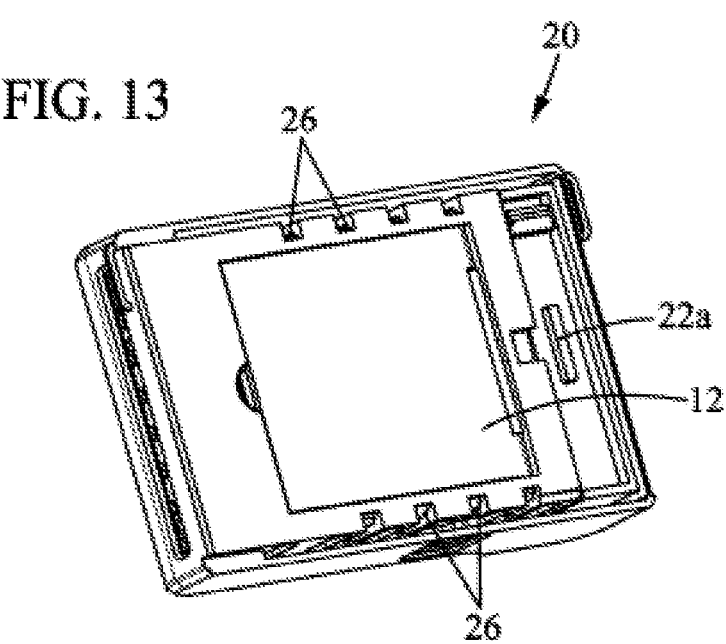

As illustrated in FIGS. 7a and 7b, the cover 3 comprises buttons adapted to actuate the buttons of the portable telecommunications system 2. The buttons of the system 2 are, for example, connected to the buttons of the cover 3 by means of a system of springs or a system of deformable seals (made of silicone for example). In particular, the cover 3 comprises the button 100 (FIG. 7a) on its surface, which allows to switch the portable system on and off.

The button 100 is mechanically connected to the on/off button 64 of the portable system 2. The cover also the sound buttons 102a, 102b (FIG. 7b). The sound buttons 102a, 102b of the cover are arranged so as to face the sound buttons 65a, 65b of the portable system 2. This Arrangement allows the user to control a sound button 65a, 65b by pressing a respective sound button 102a, 102b. The sound buttons 102a, 102b may not be buttons, but simple control transfer areas, featuring a button design, the deformability of the wall 9 in this particular location making it possible to transmit the control effort exerted by the user on the underlying button of the portable telecommunication system 2.

The cover may also feature openings 106 for accessing the connectors of the portable system 2, such as the headset connector 52b. The cover may also include cable extensions, so as to provide an extension, for example, to the USB port 52a of the portable system 2. The extension may include a USB port 107 (possibly merged with port 300), a male USB connector 201, adapted to be plugged into the USB port 52a of the portable system 2, and an electrical connection between this USB male connector 201 and the USB port 52a (FIG. 7b).

Therefore, all the functions of the portable telecommunication system 2 only accessible via its USB port 52a (charging of the battery of the portable telecommunication system 2 and communication between the portable telecommunication system 2 and an external processor, among others) are still available to the portable communication system 2 via the USB port 107 of the cover 3 and the connection between the USB port 107 of the cover 3 and the USB port 52a of the cover. In addition, the USB port 107 is used to charge the battery of the cover 3. A prioritization module may be used to manage the charge of both the battery of the portable telecommunication system 2 and that of the cover (simultaneous charging or priority charging in favor of the telecommunication system portable 2 for example).

Moreover, the processor of the portable telecommunication system 2 and that of the hull also communicate via a USB connection between the portable telecommunication system 2 and hull 3.

The optical functionalities (on one hand, the lens, the camera or the flash, on the other hand the screen) of the portable telecommunication system 2 are discovered by the hull 3. For example, the hull 3 includes openings formed in the surface of the hull 3, to discover the optical functionalities of the system 2. Opening 108 (image 5) discovers, for example, the screen of the portable telecommunication system 2. Opening 109 seen on image 8*a* discovers the lens, the camera, or the flash of the portable telecommunication system 2. This configuration allows to take a photograph when the portable telecommunication system 2 is assembled in the hull 3.

The hull 3 also includes an inkjet container 4 (or a paper tank) as seen in images 8*a* and 8*b*. The paper tank 4 included in the hull thickness 3 (image 8*a*), and accessible for the paper refill on the surface of the hull 3 (image 8*b*). The hull 3 can, for example, include a part 110 mounted on a supporting bracket on the wall 9, making it possible to open or close the paper tank 4. As an alternative, one can use any type of adapted system temporarily giving or preventing access to the paper tank. The tank makes the paper sheets available for the printer 7. Particularly, as seen on image 8*b*, the paper sheets are laid out on the roller 15, which can start the paper sheet drive to the print head as commanded. The paper tank 4, for example, lies longitudinally between the battery 6 and the mechanical printer part 7.

As represented on image 9, one can, for example, foresee that a paper 1001 refill includes a paper support 1002, such as, for example, a tray receiving several sheets 1003, and presenting a slot 1004 on one side, allowing a paper sheet to exit through the slot. The support 1002 also includes a removable fixing interface 1005 in the hull 3. On a purely illustrative basis, one envisages, for example, a system with a bayonet, in which the wall 9 includes entry slots 1006 for 1007 support 1002 stands, the support 1002 can then be moved in a transverse direction, in an entry direction, so that the stands 1007 are retained by a collection surface 1008 on the wall 9. Other detachable connection systems of refill 1001 in the hull 3 are possible.

Thus, according to an invention, one envisages a system including:

A hull for a portable telecommunication system,
A paper refill,
An adapted removable fixture interface of the paper refill and hull for alternatively secure the refill at the hull in a position where a paper support can be extracted from the paper refill for printing and collection.

In particular, for this invention, one envisages the paper refill including a removable mounting on the hull.

The hull 3 also includes a paper extraction slot 8 after printing (FIG. 1).

The way of carrying out the invention described above can include several alternatives.

In alternative, for example, the printing device 1 is detachable from hull 3.

As another alternative, like seen on image 10, the hull 3 is made up of two parts 111, 112 assembled to set the hull 3. For example, one of the parts 112 includes a part 113 which is embedded in the part 111. The portable system 2 for example is inserted in the first part 111, possibly including the printing device 1, then the second part 112 is assembled to the first part to close the hull 3, partially including the portable system 2. One also envisages a removable connection between the two parts, allowing, if necessary, to withdraw the portable telecommunication system 2 of hull 1. The removable part between the two hull parts can, in any event, be adapted, such as by a click and lock, for example. If necessary, like seen on image 11, the first parts 111 includes a reverse part 114 facing bottom 12 to retain the portable system 2 so that this one does not leave the hull. This reverse part 114 together with bottom 12 and side wall 13 form a rail for the insertion of the portable system 2. This reverse part 114 can thus be provided on the whole part of the periphery of the first 111 part or, if necessary, in specific places of this one. This geometry can also be planned for the second part 112. But, in alternative, this geometry is not planned for the second part. Moreover, if necessary, the second part 112 is optional, and the axial retention of the portable communication system 2 in the hull 3 is made differently, as seen in image 10*a*.

As an alternative, the invention considers an adapter to adapt hull 3 and the miniature printing device 1, according to the format i.e. size of the portable system 2 and according to the model, i.e. of the provision of the buttons of the portable system 2.

In particular, as seen on images 13 and 14*a*, one presents a hull 3 especially adapted for the first type of portable telecommunication system 2. The hull 3 includes a panel 20 represented on image 13, and a 21 adapter represented on image 14*a*. The panel 20 and adapter 21 are joined together in an appropriate manner, for example by screwing. At the assembly step, which is done, for example, according to an assembling direction, adapter 21 can be guided in cooperation with the guide noses 25 projecting an adapter side 21 with openings 26 distributed in the panel. Other outputs are possible.

When they are joined together, panel 20 and adapter 21 form the hull together, or part of the hull. One can, for example, foresee that, when they are joined together, panel 20 and adapter 21 form the part 111 of the hull (seen on image 10). When they are joined together, panel 20 and adapter 21 define together the hollow volume part intended to receive the portable telecommunication system 2 in an adjusted way. For example, one can provide that panel 20 defines bottom 12, and that the adapter 20 defines 13 side walls.

In this embodiment, the shell does not necessarily include part 112. This allows to improve the usability at the user's level. In this case, the side wall no. 13 extends on 3 sides and 2 corners of the mobile telecommunication system 2. The mechanical retention of the mobile telecommunications system no. 2 is the done only through part 111. For example, guidance cleats no. 25 can be used at the level of at least a side wall 13, hence enclosing the mobile telecommunications system 2. The cleats 25 can be deformed elastically to allow this retention The first cleat 25 in the direction of the insertion of the mobile telecommunication system 2 can present 27 edge beveled to guide the insertion of the mobile telecommunication system 2.

A communication system 22 is provided between the adapter 21 and the housing 20. The communication system 22 is for example, a wired system which includes a first connector 22*a* carried by the housing 20 and a second connector 22*b* carried by the adapter 21. The first and second connectors 22A, 22B are complementary so as to be connectible together, particularly depending on the direction of assembly.

The housing 20 is independent of the mobile telecommunication system 2.

The housing 20 presents sizes that accommodate many types of different portable telecommunication systems 2 Thus, the dimensions of the housing 20 are defined by the biggest or the largest mobile telecommunication systems 2 processed by the shell 3.

Thus, a first micro controller 17A contained in the housing 20, is dedicated to the implementation of the printing system from information received at the level of the connector 22a.

The adapter 21 is dedicated to the mobile telecommunication system 2. Thus, the dimensions of the adapter 21 are defined by the mobile telecommunications system 2. This applies in particular to the width measured between the side walls 13. Concerning the length of the mobile telecommunication system 2, the adapter 21 may not present specific characteristics, although this being taken into account by the part no. 112, as it is being assembled to the adapter 21.

Regarding the thickness of the mobile telecommunication system 2, it can be taken into account at the level of one or several integrated spacers 23 facing the housing 20.

Figure 14A:
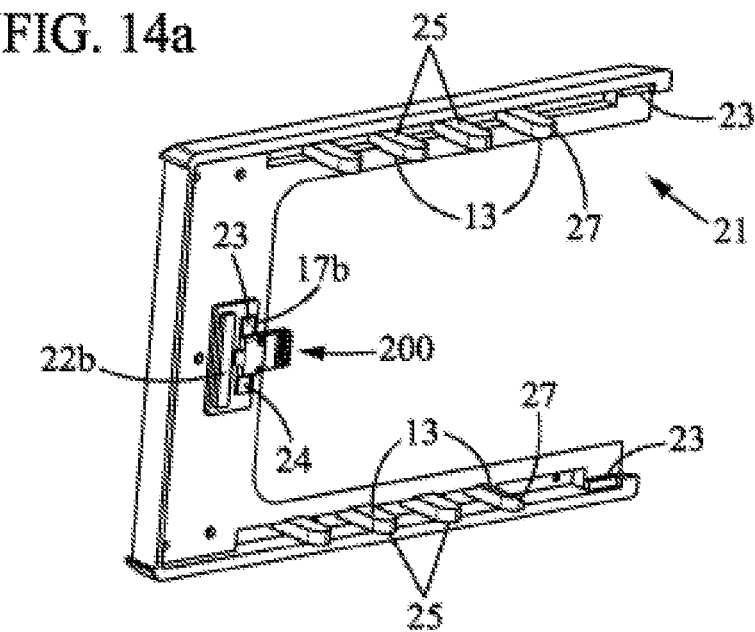

The adapter 21 includes the communication body 200. The communication body 200 is dedicated to the mobile telecommunication system 2. This is for example one and/or the other type of the position of the communication body 200. Thus, FIG. 14A represents a connection that is known today under the name of "lightning". The electrical circuit 24 transmits signals from the communication body 200 to the connector 22b. If applicable, the electric circuit 24 treats the signals to ensure that the information reaching the connector 22b are in a standard format. Thus, the 21 adapter includes a second micro controller 17b dedicated to the mobile telecommunication system 2. The second 17B micro controller manages the interaction between the shell 3 and the mobile telecommunications system 2. The first and the second micro controllers 17A, 17B together form the micro controller 17 of hull 3.

Figure 14B:
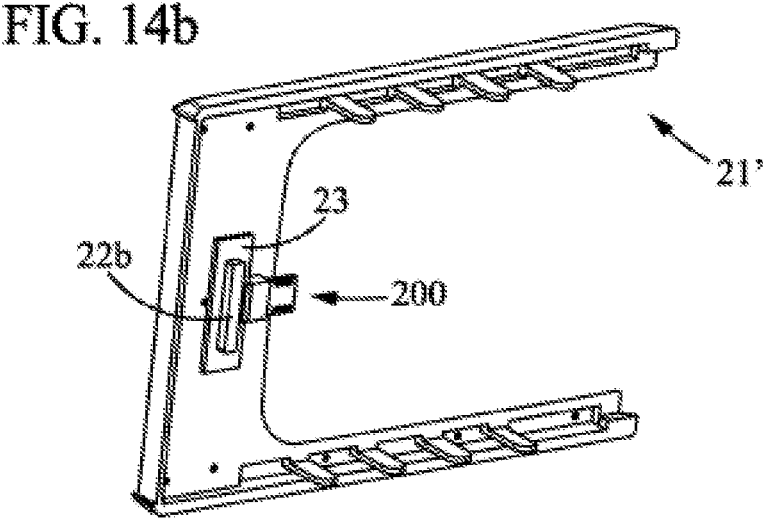
Figure 15A:
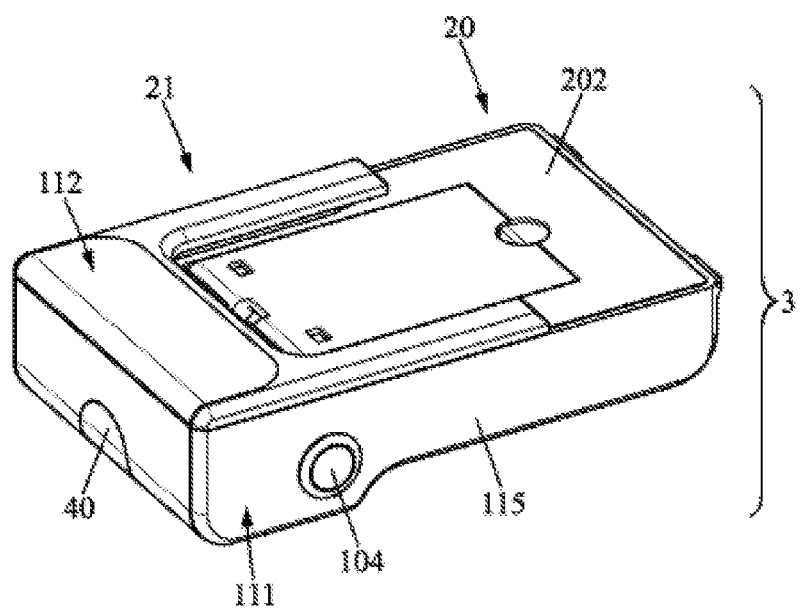
Figure 15B:
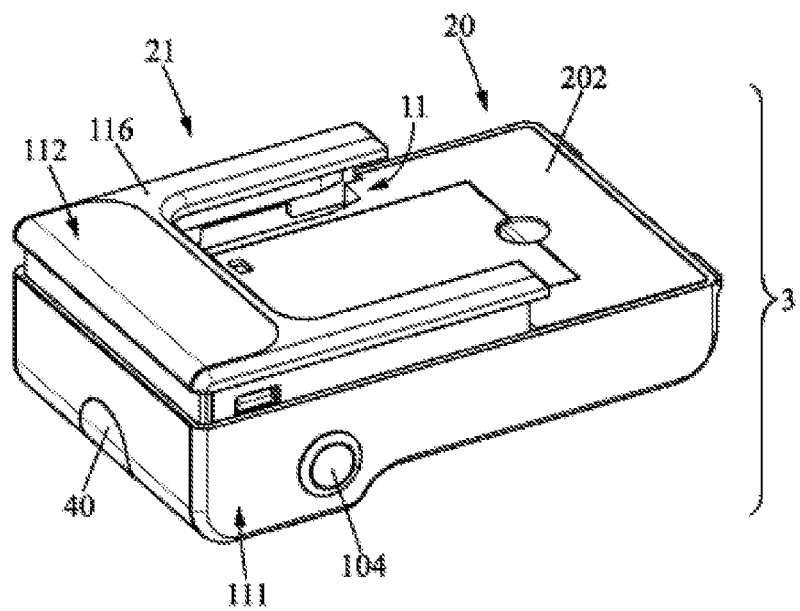

FIG. 14b represents an adapter 21' dedicated to another type of portable telecommunications system 2.

Adapters 21 and 21' differ notably from one another by one or both of the following characteristics:
the dimension of the adapter,
the connection of the adapter,
the micro-controller of the adapter,
location of component (button, opening,) of the adapter.

Concerning the geometry of the adapters 21, 21', the reference point to take into account is the connector 22b, whose position is defined by its cooperation with the connector 22a of the housing 20. With respect to the dimensions of the adapter 21', the thickness of the spacers 23 may differ compared to those of the adapter 21. The width defined between the side walls 13 may differ between the two adapters 21 and 21' by changing the thickness of the lateral cleats. Indeed, as it is visible on these figures, the adapters 21 and 21' may include the guidance cleats 25 that extend from the side of the adapter facing the housing 20. The guiding cleats 25 fit into 26 openings of the housing 20. The inner side of the guidance cleats 25 form the side walls 13. In the adapter 21', the cleats 25 are thinner than those in the adapter 20. Thus, for the same external width of the adapters 21 and 21' (corresponding to the width of the housing 20, and the location of the cap screws), the width of the hollow interior is different.

The body of the communication 200 of the adapter 21' can be different from that of the adapter 21. It is a different technology. For example, here is illustrated by one example of a so-called 'micro-USB' connector. The position of the connector may also differ. For instance, in the thickness or laterally. When necessary, the micro controller carried by the adapter 21' differs from that carried by the adapter 21 in order to adapt to the specific nature of the mobile telecommunication system 2.

The adapter 21, 21' can be fixed permanently to the housing 20. For example, it is not intended to be disconnected. However, as an alternative, a simple disassembly of the adapter 21 could be foreseen. Thus, the user will have one adaptable housing 20 10 on several of his mobile telecommunications 2 systems. The case of a family comprising several mobile different telecommunication systems 2, or a person a changing a portable telecommunications system 2 over a provided time is an example. Depending on the case, (no planned disassembly, a possible disassembly every week, or every two years), different assembly technologies may be considered. The adapter can then be marketed as an individual component, for the 20 users with already having a housing.

Although two examples of adapters have been described, it is understandable that other examples could be provided to fit different mobile telecommunication 2 systems available on the market.

Thus, according to the invention, it is expected that a wide range of shells including a plurality of shells, the control boxes 20 be identical, and adapters the 21 and 21' being different.

Thus, according to one aspect, the invention relates to 30, an adapter defines a part of a hollow volume adapted to receive a mobile telecommunications system in an adjusted way. The adapter includes a communication module 200 with the system of portable telecommunication, a microcontroller managing the interface with the portable telecommunication system, a connector 22b adapted to be connected to a panel including a miniature printing device.

In alternative seen in images 15a and 15b, hull 3 is operated in two mobile parts 111 and 112, one parallel to each other, but selecting one over the other to prevent a complete uncoupling. In this example, part 111 constitutes a base 115 and part 112 constitutes a mobile equipment 116, mobile compared to base 115. The base 115 and the mobile equipment 116 are assembled as mobile unit, one over the other, the mobile equipment 116 is able to move with a translational motion in a parallel plan at the surface of the base 115. The Hull 3 then passes from closed as seen on image 15a to open as seen on image 15b. The Hull 3 thus opens an adapted space to insert, at least partially, a portable telecommunication system 2, between base 115 and the mobile equipment 116. More precisely, the hull 3 includes a control knob 40 adapted to generate this opening movement. In an operating procedure that we describe below, the control knob 40 must be held down to hold hull 3 open and to allow the insertion of the portable telecommunication system 2. In this operating procedure, when button 40 is released, hull 3 is partially closed again on the portable telecommunication system 2 which is thus hold in hull 3.

In this particular case, panel 20 includes two parts, an upper part 220 seen on image 16 and a lower part 210 seen on image 17.

The upper part 220 seen on image 16 it's made up of two subsections, a mobile part 222 and a frame 221, the mobile part 222 is adapted to move in a translational motion in the perpendicular direction of the surface of panel 20 in relation to frame 221, the mobile part and the frame are mobile compared to the other in order not to be able to be uncoupled of each other. The mobile part 222 includes, in particular two shafts 45, for example, metallic, extending according to the translational motion in a translational direction, fixed in the mobile part 222, for example, in plastic, and the body of the mobile part 222, for example, being molded around the shafts 45. The mobile part 222 also includes two corners 42, i.e. two parts whose abutment surface is in the same inclined plan and in an oblique direction compared to the plane surface of the panel 20.

The lower part 210 seen on image 17 includes a button 400, the aforementioned button 400 including two push rods 43, each of the two push rods 43 a part of the abutment surface, in the same inclined plan of the oblique direction compared to the plane surface of the panel 20 and to that of the corners 42, but of opposed slope, so that the two push rods 43 are complementary to the two corners 42. The two push rods 43 regulate the control knob 40, the two push rods and control knob 40 were for example, molded in a part.

More precisely the lower part 210 includes a wall 90 defining the volume 1000. The volume 1000 can be, in particular, a little more convex and deep in a lower part 210, which creates a handle effect for a handy assembly by the user of the hull 3 with the portable telecommunication system 2.

The control knob 40 is accessible via an opening in the wall 90. Guides are molded on the wall 90 background of the volume 1000 exit so that the button 400 when it is pushed is guided in a translational motion and in a perpendicular direction to wall 90 on the opening level. The button 400 can be placed in particular on the bulge level of the lower part 210. The external surface of the hull 3 bulge can be, in particular, in polyurethane for one silky touch, with for example a coating in leather.

A spring 41 on the control knob 40 level exerts a pressure resistance effect of the button 40, which allows, when it is released, that this last tends to return to its initial position in its housing.

As seen in images 18a and 18b, when upper part 220 and lower 210 of the panel are assembled, the push rods 43 coincide (complementary balance and form) with corners 42, corners 42 and push rods 43, in contact with the abutments when the hull 3 is closed (images 18a). The upper part 220 and the lower part 210 are assembled in a fixed, rigid and non-removable way, via a screw system, as an example.

When the control knob 40 is pressed, this one pulls apart, according to the drive of the control knob 40, the two push rods 43 settings compared to two corners 42. The contact surface between corners 42 and push rods 43 as in an inclined plan, the upper part 220 is thus, by a movement of cam, relocated compared to the frame 221 in the direction of the shaft 45 (images 18b).

As seen in images 19a and 19b, the springs 44 are rolled up around two shafts 45, and are located between the mobile part 222 and the frames 221, locked against the frame 221 (image 19a). When the mobile part 222 is pulled apart, the two springs 44 are energized and tend to slack while putting the mobile part 222 in contact with the frame 221 (image 19b).

If the portable telecommunication system 2 is then inserted between frame 221 and the mobile part 222, the springs 44 make it possible to enclose the portable telecommunication system 2 between the frame 221 and the mobile part 222.

In an adapter operating procedure, the adapter 21 can be fixed at the mobile part 222. The frame 221 and adapter 21 are assembled as a mobile unit one over the other, the adapter 21 which can move in a translational motion in a parallel plan at the surface of the frame in view. The Hull 3 thus opens in an adapted space to insert, at least partially, a portable telecommunication system 2, between adapter 21 and body 221.

The adapter 21, illustrated in FIG. 20a, is fixed on the opposite side of the movable part 222 to the side of the movable part facing the bottom 12. The adapter 21 is also partially inserted into the chassis and translates with respect to the frame 221 when the cover 3 changes from the open to the closed position. The adapter 21 includes one of the connectors 201 according to the communication type used between the portable telecommunication system 2 and the cover 3. The portable telecommunication system 2 can therefore be inserted and secured both by the connection via the connector 201 and by the partial reclosing of the adapter 21 carried by the movable part 116 after the insertion of the portable telecommunications system 2 into the space between the case 20 and the adapter 21. Line guide pawls 25 with a beveled leading edge 26 are molded on the rear face of the adapter 21 to guide the insertion of the portable telecommunication system 2, as illustrated in FIG. 20c. The width between the line guide pawls 25 is adapted to the width of the portable telecommunication system 2 to which the adapter 21 is dedicated. Thanks to the spring system 44, it can adjust to any portable telecommunication system 2, whatever its thickness.

Different adapters 21 may be mounted on the box 20 depending on the model of the portable telecommunication system 2 considered. For this purpose, the adapter 21 can be mounted/removed from the case 20 via a system of clips 50 located on both sides of the case 20 (of its movable part 116 in particular) and adapted to fit into the openings 51 pierced through the surface of the adapter 21. The adapter 21 may be provided with a single clip on both sides of the case as illustrated in FIG. 20a. As an alternative, the case 20 could also be provided with several clips 50 on each side, as illustrated in FIG. 20b. These clips 50 will, for example, be molded with the movable part 222. To change the adapter 21 on the case 20, the user compresses the different clips 50, if possible simultaneously.

Holding the button 40 pressed makes it possible to keep the adapted space available in order to insert the portable telecommunication system 2. The release of the button 40 after insertion of the electronic device results in an, at least partial, expansion of the springs 44, which allows for a sliding path to appear so as to continue the insertion of the portable telecommunication system 2. In the inserted configuration, the complementary connector 201 of the cover 3, which can be connected to the charger connector 52a of the portable telecommunication system 2 is available to connect the portable telecommunication system 2, in particular. The release of the button 40 after insertion of the electronic device has the additional effect of maintaining the portable telecommunication system 2 in the cover 3. When the cover is in the closed position, which means when the adapter 21 makes contact with the side facing the case 20, the complementary connector 201 is housed in a housing 117 hollowed out on the surface.

The portable telecommunications system 2 thus inserted into the cover makes therefore contact with the surface of the case 20.

Figure 16:
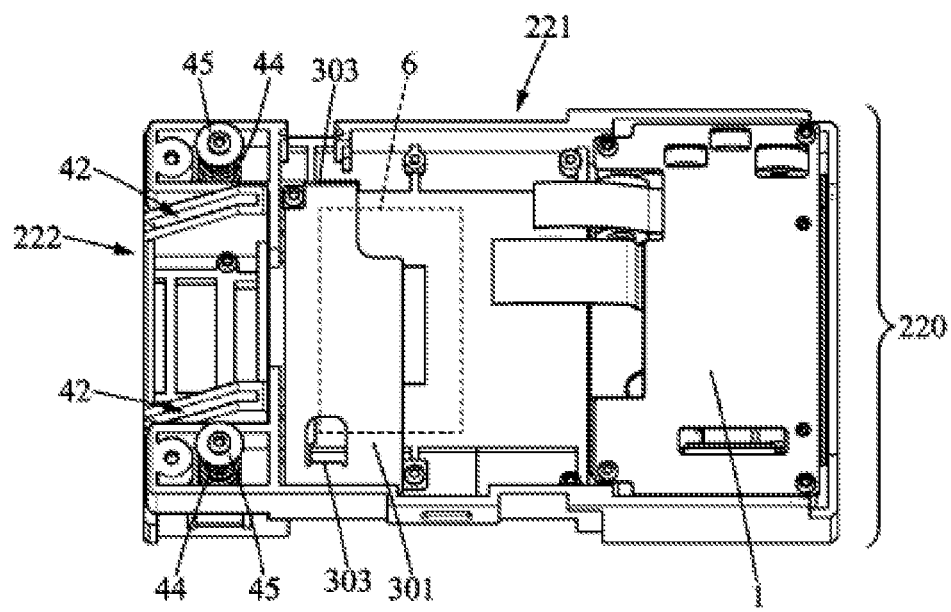
FIG. 16 shows the upper part of the shell casing to adapter.
Figure 17:
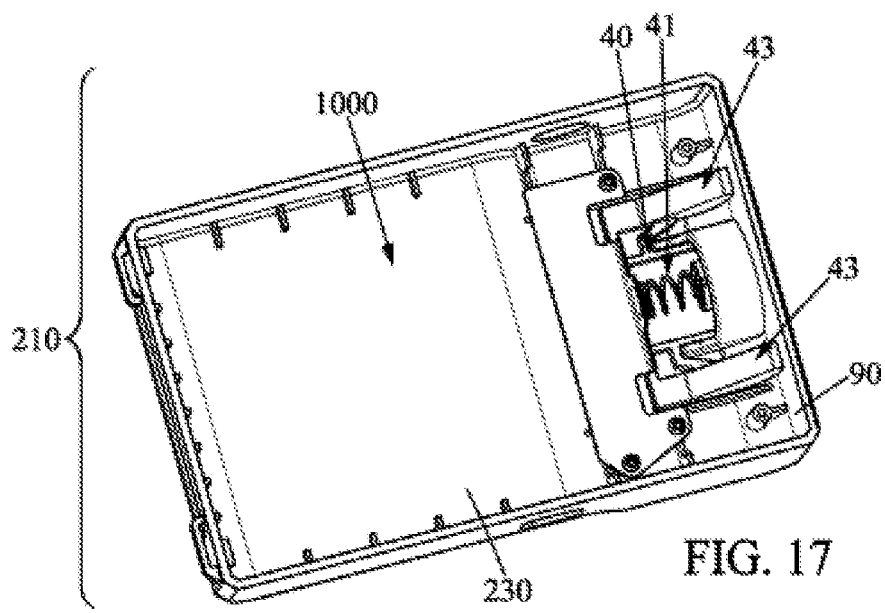
FIG. 17 is a view of the lower part of the shell casing to adapter.

The upper part 220 of the case 20 comprises a main printed circuit on its side facing the lower part 210 of the case, as illustrated in FIG. 16. The miniature printing device 1 is, for example, placed next to the main printed circuit on the side facing the lower part 210 of the case 20. A flat ribbon cable coming out of the printer are connected to the main printed circuit board. A second printed circuit is connected to the main printed circuit through a flexible flat ribbon cable. The battery 6 is housed in the same compartment and can partially cover the printed circuit. A first plate 301 made of metal, for example, may, for example, partially cover the flat ribbon cables coming out of the second printed circuit, the flat ribbon cable has a male (or female) flat connector connected to a female (or male respectively) flat connector on the inside of the adapter 21 during the mounting of the adapter on the case 20, the referred second printed circuit being connected to the mechanical connector according to the model of the portable telecommunications system 2 used. The movable part of the housing 20 has, for example, a hollowed-out section 70 where such male (or female) flat connector will be placed. The flexible flat ribbon cable allows to maintain the electrical connection of the adapter 21 despite the movements of the latter in relation to the frame.

The case 20 also includes a paper tray 4 as illustrated in FIG. 21. In the previous embodiments, the paper tray 4 may alternatively be accessible via the front side of the case 20 facing the adapter 21, or via the opposite face, as illustrated in FIG. 7b. A flap 1001 is hinged to the frame 221, allowing the paper tray 4 to be opened or closed, as illustrated in FIG. 22. A second plate 302, made of metal for example, emerges, and lies parallel with the flap inside the tray 4 to keep the inserted sheets well positioned on the tray 4 when the flap 1001 is closed. The tray is opened by means of a gripping recess 118 hollowed out in the thickness of the flap, and via a system of teeth 119 which are clipped under the thickness of the edge of the case 20 when the flap 1001 is in the closed position.

The first plate illustrated in FIG. 16 can be used, among other things, to form protruding flaps 303 through the surface of the casing facing the adapter 21. Such flaps make it possible, in particular, via a spring system 304, to eliminate the play in the plane of the tray 4, in such a way that, when the flap 1001 is in the closed position, the elements which block the closing of the flap 1001 (teeth for example) are well maintained under the thickness of the case 20 with the flap 1001 in the closed position. The paper tray 4 can be molded according to the thickness of the frame 221.

FIG. 24 illustrates the cover 3 assembled to the portable telecommunications system 2.

In this embodiment as well, the optical functionalities such as the lens, the camera or the flash, of the portable telecommunications system 2 are left uncovered by the cover 3. For example, the cover 3 has openings through its surface, to leave optical functionalities of the portable telecommunication system 2 (the lens, the camera, or the flash of the portable telecommunications system 2) uncovered.

The invention also considers a computer program designed to trigger the printing of a document stored in the memory of the portable telecommunications device 2. The computer program is stored on the portable telecommunication system 2. It is run, for example, by a processor on the portable telecommunications system 2. The computer program transfers the computer document to the printing device 1 through the communication device 200 and then communicates with the electronic card 5 which manages the printing as described above. An application is developed, under LINUX for example, for this portable telecommunication system 2, in order to run this computer program.

As a first step, the application allows, for example, to choose an image to be printed from one or more platforms, which may be the photo gallery of the portable telecommunications system 2, or databases hosted by social network systems. After selecting the image, the user of the portable telecommunication system 2 is directed to the printing step with the selected image as the background of the portable telecommunication system 2. As soon as it is confirmed by the user, the printing is launched on the printing support. In order to confirm the printing, the user can, for example, touch and move his/her finger towards the bottom of the screen, in the direction of slot 8, just as if to get the print out. Once the finger moves past a trigger distance and released, the printing starts. If the user releases it before reaching the end of the trigger distance, the picture returns to its initial position.

Thus, in one respect, an invention relates to a method whereby:

A photo to be printed is selected,

A detected movement on the surface of the screen of the portable telecommunications system is compared with a predetermined movement corresponding with the launch of a print, In the event that the comparison gives a positive result, the printing is triggered, In which the predetermined movement involves a continuous shift of an amplitude higher than a predetermined amplitude in a direction predominantly pointing to the slot 8.

Once the printing has been validated, as the printing support comes out, printed-out, through the slot 8 of the cover 3, the picture to be printed slides downwards in order to move out of the screen of the telecommunication system Portable device 2 synchronously with the printing, as illustrated in FIG. 12.

Thus, in one respect, an invention relates to a method whereby:

A picture to be printed is displayed on a screen of the portable telecommunication device, After a print order is received, multiple pictures, each one corresponding to a translational movement of the previous image to be printed towards the printing slot are successively and repeatedly displayed on that screen, the said translational movement being synchronized with the printing speed.

Alternatively, the application is also adapted to capture a picture with the camera of the portable telecommunications system 2, for example.

As an alternative, the assembly 0 is made of several cameras, at the front and at the rear for example, and the application allows to switch from one camera to another. The application also allows, among other things, to activate the flash, or to display a positioning grid or a photo filter on the screen of the portable telecommunications system 2.

As an alternative, before printing, when the picture to be printed is displayed on the screen, the user can edit the image and rework it (resize the image, use filters, hues and saturation, or stickers among other things).

The application could be made automatically available on the "smartphone" for example, whenever the shell 3 is mechanically connected to the "smartphone". For this purpose, the cover 3 may include a sensor detecting the connection of the cover 3 to the portable telecommunication system 2, and automatically launching the application.

The cover may include a trigger button 104 to take photos (FIG. 7a). When the user hits the button 104, a signal is sent to the microprocessor of the printing device 1 and then transmitted to the portable system 2 through the communication component 200. The application will then start taking the photo, as if the user had pressed the picture-taking icon on the screen of the phone. In the last embodiment, the trigger button 104 may be housed in the wall of the lower part of the case 221, and may be provided with a spring so as to make the touch softer, as when pressing the button of a camera. The main printed circuit of the last embodiment described is such that it can be extended up to its connection point to the trigger button 104, the housing of which is open in the wall of the frame 221, as illustrated in FIG. 16. The trigger button 104 may be provided with a toothed system 120, as illustrated in FIG. 23, for example, so as to hold the trigger button 104 in its housing.

Alternatively, the trigger button 104 is also adapted to trigger the printing of a photo when pressed. In this case, the shell 3 prevents printing when the trigger button 104 is activated in case the connection of the cover 3 to the portable telecommunication system 2 is not detected.

Alternatively, trigger button 104 is adapted to trigger the photo capture and printing automatic sequence when pressed.

As an alternative, the printing of a photo is controlled via the touch screen 58 of the portable telecommunications system 2 by activating the application suitable for triggering photo capture.

The invention claimed is:

1. A device for printing digital media from a portable telecommunications device comprising:
   a portable telecommunications device, wherein the portable telecommunications device has at least one photo stored on a memory system within the portable telecommunications device;
   a cover configured to attach to the portable telecommunications device, wherein the cover is mechanically and removably connected to the telecommunications device, wherein the cover comprises a communication system configured to receive the at least one photo stored on the memory of the portable telecommunications device, wherein the cover further comprises a trigger button; and
   a printing device, wherein the printing device is configured to print the least one photo stored on the memory of the portable telecommunications device after the at least one photo is received by the communication system.

2. The device for printing digital media from a portable telecommunications device of claim 1, wherein the trigger button is configured to launch an application on the portable telecommunications device and capture a photo when pressed.

3. The device for printing digital media from a portable telecommunications device of claim 2, wherein the trigger button is further configured to launch a photo capture and printing sequence when pressed.

4. The device for printing digital media from a portable telecommunications device of claim 1, further comprising a sensor configured to detect the connection of the cover to the portable telecommunications device.

5. The device for printing digital media from a portable telecommunications device of claim 1, wherein the cover is further configured to prevent the at least one photo from being printed when the trigger button is activated if the connection of the cover to the portable telecommunication device is detected as negative.

6. The device for printing digital media from a portable telecommunications device of claim 1, wherein printing the at least one photo via the printing device is controlled via a touch screen of the portable telecommunications device.

7. The device for printing digital media from a portable telecommunications device of claim 1, further comprising an application, wherein the application is launched by connecting the portable telecommunication device to the cover.

8. The device for printing digital media from a portable telecommunications device of claim 7, wherein the application is dedicated to at least one of photo capture and photo printing.

9. The device for printing digital media from a portable telecommunications device of claim 1, wherein the printing device receives the at least one photo via the communication system of the portable telecommunications device via at least one of a wired connection and a wireless connection.

10. The device for printing digital media from a portable telecommunications device of claim 1, wherein the portable telecommunications system comprises of a smartphone.

11. The device for printing digital media from a portable telecommunications device of claim 1, further comprising an external base, wherein the external base is configured to be connected to the portable telecommunications device via radio waves.

12. The device for printing digital media from a portable telecommunications device of claim 1, wherein the portable telecommunications device further comprises an internal memory system, wherein the at least one photo is captured by the portable communications device and stored on the internal memory system.

13. The device for printing digital media from a portable telecommunications device of claim 1, wherein the portable telecommunications device further comprises an external memory system, wherein the external memory system includes the at least one photo and is configured to send the at least one photo to the portable telecommunications device.

14. A system for printing digital media from a portable telecommunications device comprising:
   a cover configured to be mechanically and removably attached to a portable telecommunications device, wherein the cover further comprises a trigger button;
   a paper refill, wherein the paper refill is configured to be affixed to the telecommunications device; and
   a detachable mounting interface for the paper refill and the cover, wherein the detachable mounting interface is configured to affix the paper refill to the cover at a position where a paper medium can be removed from the paper refill.

* * * * *